US008078835B2

(12) United States Patent
Yang et al.

(10) Patent No.: US 8,078,835 B2
(45) Date of Patent: *Dec. 13, 2011

(54) RECONFIGURABLE ARRAY PROCESSOR FOR FLOATING-POINT OPERATIONS

(75) Inventors: Hoon Mo Yang, Gyeonggi-do (KR); Man Hwee Jo, Seoul (KR); Il Hyun Park, Chungcheongbuk-do (KR); Ki Young Choi, Seoul (KR)

(73) Assignee: Core Logic, Inc., Seoul (KR)

( * ) Notice: Subject to any disclaimer, the term of this patent is extended or adjusted under 35 U.S.C. 154(b) by 666 days.

This patent is subject to a terminal disclaimer.

(21) Appl. No.: 12/126,825

(22) Filed: May 23, 2008

(65) Prior Publication Data

US 2009/0113169 A1 Apr. 30, 2009

(30) Foreign Application Priority Data

Sep. 11, 2007 (KR) .................. 10-2007-0092139

(51) Int. Cl.
*G06F 15/00* (2006.01)
*G06F 15/76* (2006.01)
(52) U.S. Cl. ............... 712/16; 712/10; 712/229
(58) Field of Classification Search ...... 712/16
See application file for complete search history.

(56) References Cited

U.S. PATENT DOCUMENTS

| 5,966,528 | A | * | 10/1999 | Wilkinson et al. | 712/222 |
| 6,553,479 | B2 | * | 4/2003 | Mirsky et al. | 712/16 |
| 6,971,083 | B1 | * | 11/2005 | Farrugia et al. | 716/116 |
| 7,082,451 | B2 | * | 7/2006 | Kulkarni et al. | 708/404 |
| 7,242,216 | B1 | * | 7/2007 | Schmit et al. | 326/39 |
| 2004/0103265 | A1 | * | 5/2004 | Smith | 712/15 |
| 2005/0086650 | A1 | * | 4/2005 | Yates et al. | 717/139 |
| 2005/0171990 | A1 | | 8/2005 | Bishop et al. | |

OTHER PUBLICATIONS

Shamsiah Suhaili et al., "Design and Implementation of Reconfigurable ALU on FPGA," *3rd International Conference on Electrical & Computer Engineering*, ICECE 2004, Dec. 28-30, 2004, Dhaka, Bangladesh, pp. 56-59.

Dominique Lavenier et al., "Integer / Floating-point Reconfigurable ALU," *Technical Report LA-UR #99-5535*, Los Alamos National Laboratory, Computer Research and Application, Los Alamos, NM, Nov. 1999, pp. 1-20.

* cited by examiner

*Primary Examiner* — Corey S Faherty
(74) *Attorney, Agent, or Firm* — Edwards Angell Palmer & Dodge LLP; Kongsik Kim

(57) ABSTRACT

A processor for performing floating-point operations includes an array of processing elements arranged to enable a floating-point operation. Each processing element includes an arithmetic logic unit to receive two input values and perform integer arithmetic on the received input values. The processing elements in the array are connected together in groups of two or more processing elements to enable floating-point operation.

31 Claims, 13 Drawing Sheets

RECONFIGURABLE ARRAY PROCESSOR FOR FLOATING-POINT OPERATIONS

CLAIM OF PRIORITY

This application claims priority under 35 USC §119(a) to Korean Patent Application No. 10-2007-0092139, filed on Sep. 11, 2007, in the Korean Intellectual Property Office, the entire contents of which are hereby incorporated by reference.

TECHNICAL FIELD

The present disclosure relates to digital information processing and apparatus suitable for various applications including multimedia platforms.

BACKGROUND

Digital information processing and apparatus for performing complex data processing can be implemented for various application including multimedia platforms. As the demand for high-quality multimedia services increases, application programs can be developed for efficiently processing audio data and/or video data in mobile systems, such as cellular telephones, smart phones, personal digital assistances (PDAs), etc. These application programs can perform data intensive computations and can be implemented using a software implementation (SI) operated on a target processor and/or using an application specific integrated circuit (ASIC) type hardware implementation (HI).

SUMMARY

Digital information processing and apparatus for performing floating-point operations are described. In one aspect, a processor for performing floating-point operations includes an array of processing elements arranged to enable a floating-point operation. Each processing element includes an arithmetic logic unit to receive two input values and perform integer arithmetic on the received input values. The processing elements in the array are connected together in groups of two or more processing elements to enable floating-point operation.

Implementations can optionally include one or more of the following features. The arithmetic logic unit can include a 16-bit arithmetic logic unit. The processing elements of the array can be connected in a mesh structure to enable data communications among the connected processing elements. In addition, the array can be selectively configurable to perform at least one of an integer arithmetic operation using each processing element, and a floating-point operation using each group of two or more processing elements connected together. At least two processing elements in a row or a column of the array can be connected together to form the two or more groups to perform floating-point operations. The array can be selectively configured to operate in an 8×5 arrangement structure when performing the integer arithmetic operation, and operate in a 4×5 arrangement structure in which the processing elements are connected in pairs in each column of the array when performing the floating-point operation. Further, a configuration cache can be connected to the array to store a context that controls the integer arithmetic and/or floating-point arithmetic operations performed by the processing elements in the columns or rows of the array. The configuration cache can also control the data communications among the processing elements. The processing elements can be configured in columns or rows based on the context to form a pipeline, and forward a result of a pipeline operation to a direction designated by the context.

Implementations can optionally include one or more of the following features. Each of the two or more groups of two or more processing units can be configured to perform the integer arithmetic operation or the floating-point arithmetic operation through temporal mapping. In addition, each of the two or more groups of two or more processing units can be configured to receive a next context after a final value of the integer arithmetic operation or the floating-point arithmetic operation is obtained. Further, each of the two or more groups of two or more processing elements can be configured to receive a control signal from the context so as to perform a multi-cycle operation. The two or more groups of two or more processing elements can be configured to perform four fundamental rules of arithmetic and transcendental function arithmetic for floating-point operations. In addition, each of the two or more groups of two or more processing elements can include two of the processing elements connected to perform the four fundamental rules of arithmetic. The two connected processing elements in each group can include a mantissa processing element to receive signs and mantissas of two operands and an exponent processing element to receive exponents from the two operands. The mantissa processing element is connected to at least one of a multiplier and a divider to multiply or divide the mantissa of the two operands. The exponent processing element is configured to add or subtract the exponents of the two operands. Further, each processing element can include two multiplexers connected to the arithmetic logic unit to provide at least the two input values to the arithmetic logic unit. Each processing element can also include a shifter connected to the arithmetic logic unit to perform a shift operation on a result received from the arithmetic logic unit. In addition, a temporary register can be connected to the arithmetic logic unit and the shifter to store an interim result of the arithmetic logic unit and an interim result of the shifter. Further, an output register can be connected to the arithmetic logic unit and the shifter to store a final result of the arithmetic logic unit and a final result of the shifter. Each of the multiplexers can be configured to select data from data received from a data bus, other processing elements and own register file. The selected data is provided as input to the arithmetic logic unit. Final results stored in the output register can also be input into other processing elements. Alternatively, the final results can be provided as output through a data bus.

In another aspect, a reconfigurable array processor includes an array of processing elements configured to perform one or more floating-point operations. The processing elements in the array are connected together in groups of two or more processing elements. The reconfigurable array processor also includes a configuration cache connected to the array to store a context. The stored context is configured to control one or more arithmetic operations performed by the processing elements in each column or row of the PE array, and enable data communications among the processing element. In addition, a frame buffer is connected to the array and operates as a cache memory to store an interim result of the one or more arithmetic operations performed by the array.

Implementations can optionally include one or more of the following features. Each of the processing elements can include an arithmetic logic unit to receive and process two input values. The processing elements of the array can be connected in a mesh structure to enable data communications among the processing elements. The array can be selectively configured to perform an integer arithmetic operation using each of the processing elements. Alternatively, the array can be selectively configured to perform the one or more floating-point operations using each of the two or more groups of two or more processing elements connected together. Each of the two or more groups of two or more processing elements can include at least two processing elements in a row or a column of the array connected to perform the one or more floating-point operations. The array can be selectively configured to operate in an 8×5 arrangement structure when performing the integer arithmetic operation. Alternatively, the array can be selectively configured to operate in a 4×5 arrangement structure in which the processing elements are connected in pairs in each column of the array when performing the floating-point operation. Based on the context, the processing elements can be configured in columns or rows to form a pipeline, and a result of a pipeline operation is forwarded to a direction designated by the context.

Implementations can optionally include one or more of the following features. Each of the two or more groups of two or more processing units can be designed to perform the integer arithmetic operation or the one or more floating-point arithmetic operations through temporal mapping. Also, each group can be configured to receive a next context after a final value of the integer arithmetic operation or the floating-point arithmetic operation is obtained. Further, each group can be designed to receive a control signal from the context layer so as to perform a multi-cycle operation. The two or more groups of two or more processing elements can be configured to perform four fundamental rules of arithmetic and transcendental function arithmetic for floating-point operations. Each group of two or more processing elements can include two of the processing elements connected to perform the four fundamental rules of arithmetic. The two connected processing elements in each group can include a mantissa processing element to receive signs and mantissas of two operands and an exponent processing element to receive exponents from the two operands. The mantissa processing element can be connected to at least one of a multiplier and a divider to multiply or divide the mantissa of the two operands. In addition, the exponent processing element can be configured to add or subtract the exponents of the two operands.

Implementations can optionally include one or more of the following features. The frame buffer can be configured to include a 24-bit floating-point format. The 24-bit floating-point format includes one sign bit, eight exponent bits, and fifteen mantissa bits. The mantissa processing element is configured to convert the received signs and mantissas of the two operands into the one sign bit and the fifteen mantissa bits of the frame buffer. Further, the converted one sign bit and the fifteen mantissa bits can be stored in the frame buffer. The exponent processing element can be implemented to convert the received exponents of the two operands into the eight exponent bits of the frame buffer, and store the converted eight exponent bits in the frame buffer. Each processing element can include two multiplexers connected to the arithmetic logic unit to provide at least the two input values to the arithmetic logic unit. A shifter can be connected to the arithmetic logic unit to perform a shift operation on a result received from the arithmetic logic unit. Further, a temporary register can be connected to the arithmetic logic unit and the shifter to store an interim result of the arithmetic logic unit and an interim result of the shifter. In addition, an output register can be connected to the arithmetic logic unit and the shifter to store a final result of the arithmetic logic unit and a final result of the shifter. Each of the multiplexers can be designed to select data from data received from a data bus, other processing elements and own register file. Each multiplexer can also input the selected data into the arithmetic logic unit, and input final results stored in the output register into other processing elements or output the final results through a data bus. The array can include a coarse-grained reconfigurable array. Further, a reconfigurable array control unit can be connected to the array to control operations of the array, the configuration cache and the frame buffer.

In other implementations, a computing platform includes a reconfigurable array processor comprising various components including an array of processing elements configured to perform one or more floating-point operations. The processing elements in the array are connected together in groups of two or more processing elements. In addition, a configuration cache is connected to the array to store a context configured to control one or more arithmetic operations performed by the processing elements in each column or row of the PE array. The context is also configured to enable data communications among the processing element. Further, a frame buffer is connected to the array and operates as a cache memory to store an interim result of the one or more arithmetic operations performed by the array. Also, a system bus is connected to the reconfigurable array processor. In addition, a control and memory unit is connected to the reconfigurable array processor through the system bus to control the reconfigurable array processor and store data.

Implementations optionally can include one or more of the following features. The control and memory unit can include an embedded core processing and controlling data, an external memory storing data and a direct memory access controller transferring data. The embedded core can include a reduced instruction set computer processor or a hybrid processor having both the characteristics of the reduced instruction set computer processor and a complex instruction set computer processor. Also, the multimedia platform can be implemented in a system on chip structure to connect the components of the reconfigurable array processor to components of the control and memory unit through the system bus. Each of the processing elements can include an arithmetic logic unit to receive and process two input values. The processing elements of the array can be connected in a mesh structure to enable data communications among the processing elements. The array can be selectively configured to perform an integer arithmetic operation using each of the processing elements. Alternatively, the array can be selectively configured to perform the one or more floating-point operations using each of the two or more groups of two or more processing elements. The processing elements can be configured in columns or rows based on the context to form a pipeline. The result of a pipeline operation is forwarded to a direction designated by the context. Each of the two or more groups of two or more processing units can be configured to perform the integer arithmetic operation or the one or more floating-point arithmetic operations through temporal mapping. Each of the two or more groups receives a next context after a final value of the integer arithmetic operation or the floating-point arithmetic operation is obtained. Further, each of the two or more groups can be configured to receive a control signal from the context so as to perform a multi-cycle operation.

Implementations can optionally include one or more of the following features. The two or more groups of two or more processing elements can be configured to perform four fundamental rules of arithmetic and transcendental function arithmetic for floating-point operations. Each of the two or more groups can include two of the processing elements connected to perform the four fundamental rules of arithmetic. The two connected processing elements in each group can include a mantissa processing element to receive signs and mantissas of two operands and an exponent processing element to receive exponents from the two operands. The mantissa processing element can be connected to at least one of a multiplier and a divider to multiply or divide the mantissa of the two operands. In addition, the exponent processing element can be configured to add or subtract the exponents of the two operands. In addition, the frame buffer can be implemented to have a 24-bit floating-point format including one sign bit, eight exponent bits, and fifteen mantissa bits. Each processing element can include two multiplexers connected to the arithmetic logic unit to provide at least the two input values to the arithmetic logic unit. In addition, a shifter can be connected to the arithmetic logic unit to perform a shift operation on a result received from the arithmetic logic unit. A temporary register can be connected to the arithmetic logic unit and the shifter to store an interim result of the arithmetic logic unit and an interim result of the shifter. An output register can be connected to the arithmetic logic unit and the shifter to store a final result of the arithmetic logic unit and a final result of the shifter. Each multiplexer can be configured to select data from data received from a data bus, other processing elements and own register file. Each of the multiplexers is also designed to input the selected data into the arithmetic logic unit. Further, each multiplexer can input final results stored in the output register into other processing elements or alternatively output the final results through a data bus. The reconfigurable array processor comprises a coarse-grained reconfigurable array. Also, the reconfigurable array processor can include a reconfigurable array control unit connected to the array to control the components of the reconfigurable array processor. Accordingly, an operation processor having high hardware and processor efficiency can be implemented.

Furthermore, the multimedia platform including the RA processor based on the present invention is implemented in a SoC structure including the above-described operation processor with high performance, and thus the multimedia platform can be effectively applied to current mobile multimedia requiring low power consumption and a high performance-to-cost ratio.

The techniques based on the present specification possibly can provide one or more of the following advantages. A reconfigurable array (RA) processor can be implemented to enable floating-point operations relatively rapidly. The RA processor can be implemented to have a low power consumption and a high performance-to-cost ratio while having a hardware size similar to (or smaller) than a conventional RA processor using the existing PE performing integer arithmetic. Further, the RA processor can perform a single instruction stream multiple data stream (SIMD) operation while maintaining high hardware reusability. Thus, the RA processor can have high operating performance even while having a smaller hardware than a hard-wired logic and a lower rate clock signal than a clock signal used for software. Since these characteristics can enable reduction of chip cost and power consumption, the RA processor can be suitable for a mobile multimedia platform having strictly limited hardware resources.

In such manners, the RA processor based on the present specification can alleviate some of the following deficiencies of SI and HI. While the SI may sufficiently support various application programs due to its flexibility, the SI may not be able to cope with the complexity of various application programs. For example, although the SI may be able to implement a rapid and flexible CODEC using a digital signal processor (DSP) dedicated core, the SI may still require a high-rate clock signal because the software sequentially performs various operations.

Although HI can be optimized in terms of power consumption and operation execution efficiency, the HI may be limited to specific application programs. More specifically, an ASIC IP implemented using a conventional hard-wired circuit may be able to guarantee a high speed. However, such ASIC IP may have a large chip size and high power consumption because the ASIC IP tend to have very low hardware reusability and require a long development time since the circuit must be re-designed whenever a new function is added. Furthermore, current chip manufacturing techniques can integrate a variety of complicated functions into a single chip owing to the development of system on chip (SoC) and the influence of digital convergence, which may continue to add to the size and power consumption concerns.

BRIEF DESCRIPTION OF THE DRAWINGS

Like reference symbols and designations in the various drawings indicate like elements.

DETAILED DESCRIPTION

Figure 1:
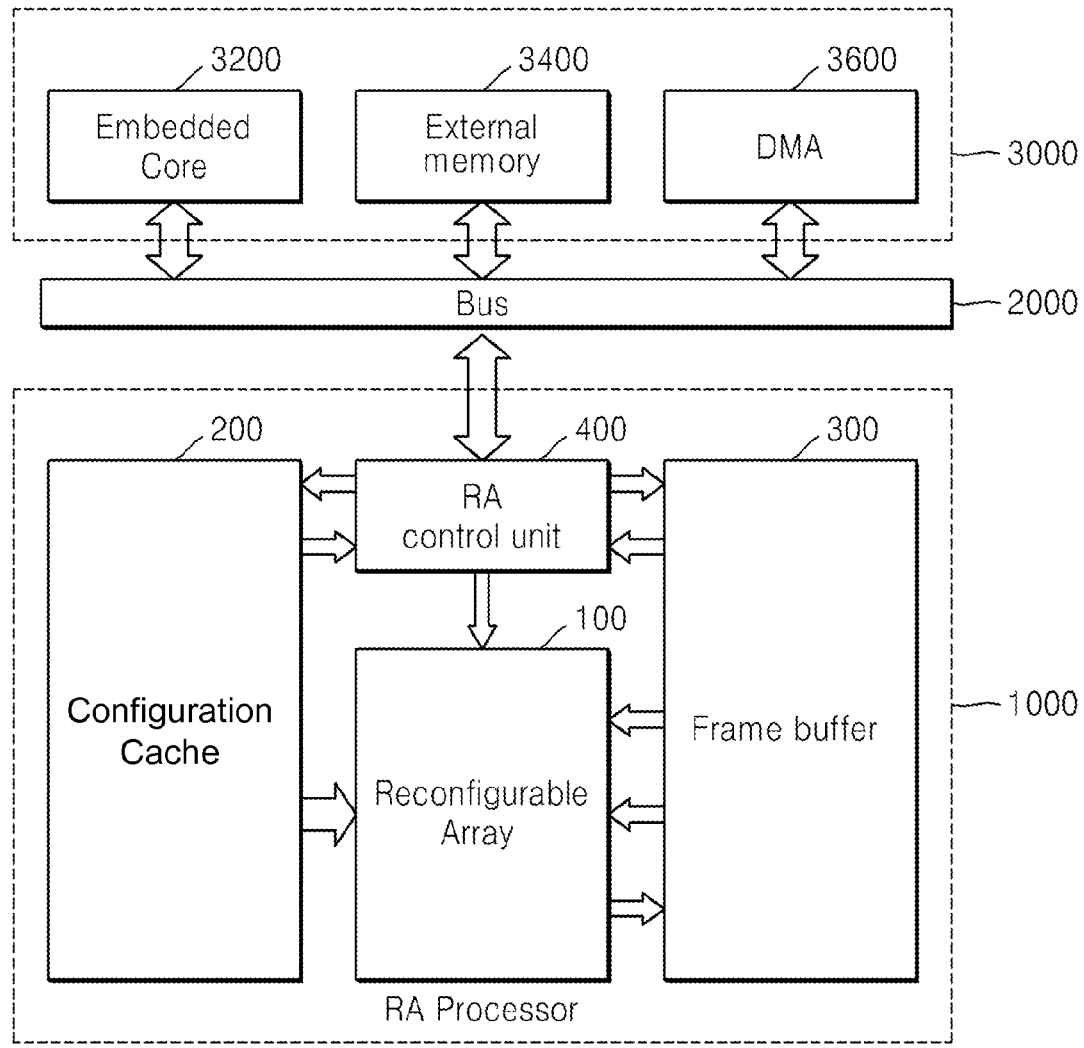
FIG. 1 is a block diagram of a multimedia platform including a reconfigurable array (RA) processor.

Various techniques, systems and computer program products are described for efficiently performing data intensive operations in a multimedia platform. In particular, the techniques and systems based on the present specification can be implemented to provide a reconfigurable array (RA) processor that enables floating-point operations.

Briefly, floating-point representation in computing can be defined as a numerical representation system that uses a string of digits (or bits) to represent a real number. The Institute of Electrical and Electronics Engineers (IEEE) Standard for Binary Floating-Point Arithmetic (IEEE 754) provides a widely-used standard for floating-point computation in many CPU and FPU implementations. In floating-point representation, the radix point (decimal point or binary point) can be placed anywhere relative to the digits within a string.

The floating-point representation enables various advantages over the fixed-point integer representations. In particular, floating-point representation can support a much wider range of values than fixed-point representations. For example, a fixed-point representation that allocates eight decimal digits and two decimal places can represent numbers such as 123456.78, 1234.56, 123.45, and etc. In contrast, a floating-point representation with eight decimal digits can represent not only the above numbers in the fixed-point representation but also numbers that can not be represented by the fixed-point representation. Examples of such floating-point representation with eight decimal digits include 1.2345678, 1234567.8, 0.000012345678, 12345678000000000, and etc. The floating-point representation can be considered as the scientific notation of the computing world.

A floating-point representation of a target real number includes a string of digits called the mantissa (or significand). The representation of the mantissa can be defined by selecting a base or radix, and the number of digits stored in the selected base. The floating-point representation also includes a value called the exponent. The exponent is used to record/identify the position, or offset, of the window of digits into the target real number. The exponent can also be referred to as the characteristic, or scale. The window of digits is used to store the most significant digits in the target real number, which are the first non-zero digits in decimal or bits in binary. The mantissa is multiplied by the exponent, which represents the power of the base.

To add floating point numbers, the operands are first represented using the same exponent. For example, when adding the two operands, 12.345 and 123.45, the operands can be presented as $0.12345 \times 10^2$ and $1.2345 \times 10^2$ (same exponent $10^2$). Thus, the digits of the first operand are shifted to the left by 1 digit. The sum of $0.12345 \times 10^2$ and $1.2345 \times 10^2$ can be then calculated as $(0.12345+1.2345) \times 10^2 = 1.35795 \times 10^2$. The resultant exponential number can be converted to the engineering notation (exponent=5 (e=5); mantissa=1.35795 (m=1.3795)). This final true some can be rounded and normalized as needed.

To multiply floating-point numbers, the mantissas are multiplied while the exponents are added. For example, (e=2; m=1.111×e=2; m=2.222)=(e=4; m=2.468642) before rounding or normalizing.

An RA processor can be implemented as a fine-grained RA (FGRA) processor or a coarse-grained RA (CGRA) processor. The FGRA has a processing element (PE) implemented as a truth table logic circuit that performs Boolean operations and bitwise operations. The CGRA has a PE implemented as an arithmetic and logic unit (ALU) that performs word-wise arithmetic/logic operations.

The FGRA may be the more flexible structure because of the ability to perform an arbitrary operation. However, the FGRA can have a complicated control and data paths, and thus the FGRA may be better suited for a circuit that does not require a high operating speed or a circuit that values function inspection over operating speed.

The CGRA can be sufficiently flexible at an algorithm level but may be limited at a resistor transistor logic (RTL) level. Also, the CGRA can be easily arranged in parallel and thus making it suitable for multimedia platforms. Thus, the CGRA can achieve higher performance than the SI and wider flexibility than the HI.

In particular, the CGRA can include programmable PEs and programs. Thus, the PEs can be reconfigured based on a context that designates connectivity and operations of the PEs so as to execute various functions merely by changing the contents of the context without adding new hardware. Typical CGRAs can include Morphosys, Architecture for Dynamically Reconfigurable Embedded System (ADRES), extreme processing platform (PACT-XPP) and etc. However, a conventional RA tends to support only integer arithmetic and thus its application range tend to be limited to audio/video CODECs.

Some of the 3D graphics/2D vector graphics/GPS and the like may not be suitable for being processed with a conventional integer-based CGRA because those 3D graphics/2D vector graphics/GPS devices tend to be based on floating-point vector operations. To support graphics, a PE can be designed based on floating-point operations. However, this design can excessively increase the hardware size of the PE. Also, because CODEC is implemented only with integer arithmetic operations, blocks related to floating-points in hardware constituting a PE tend to promote inefficient hardware usage.

An RA processor based on the present specification can perform a single instruction stream multiple data stream (SIMD) operation while maintaining high hardware reusability. Thus the RA processor of the present specification can achieve high operating performance even while having a smaller hardware than a hard-wired logic and a lower rate clock signal than a clock signal used for software. Since these characteristics can enable reduction of chip cost and power consumption, the RA processor can be suitable for a mobile multimedia platform having strictly limited hardware resources.

FIG. 1 is a block diagram of an example computing platform, such as a multimedia platform that includes a reconfigurable array (RA) processor implemented based on the techniques and systems of the present specification. Referring to FIG. 1, the multimedia platform includes an RA processor 1000 designed to perform floating-point operations connected to a control and memory unit 3000 using a system bus 2000. The control and memory unit 3000 interfaces with the RA processor 1000 through the system bus 2000 to control the RA processor and store data.

The RA processor 1000 includes a processing element (PE) array or an RA 100, a configuration cache 200, a frame buffer 300, and an RA controller 400. The PE array 100 can be a rectangular array including an arithmetic logic unit (ALU) cell that performs pipelined single instruction stream multiple data stream (SIMD) operations column by column and/or row by row. The PE array 100 can support floating-point operations. The PE array 100 described further with reference to FIG. 2.

The configuration cache 200 is designed to store a context that programs data operations and data transfer in the PE array 100. For example, the context includes an instruction or a program that designates connectivity of PEs, an operation of each PE and data transfer for operations in the PE array 100. The context is stored in a context layer of the configuration cache 200.

The frame buffer 300 is a cache memory that temporarily stores interim data of operations performed in the PE array 100. The frame buffer 300 is described further with reference to FIGS. 9A and 9B.

The RA controller 400 is designed to control the components of the RA processor. For example, the RA controller 400 can control input/output of the context of the configuration cache 200, data input/output of the frame buffer 300 and data transfer to the PE array 100.

The RA processor 1000 can perform various operations by modifying the context without changing the hardware. Furthermore, the RA processor 1000 is designed to perform operations in parallel through a pipelined SIMD array. Thus, the RA processor 1000 can achieve an operating speed that is higher than that of a conventional processor that sequentially performs operations. Furthermore, the RA processor 1000 has a structure that can enables hardware reusability and high performance.

The components of the RA processor 1000 (e.g., RA 100, configurable cache 200, frame buffer 300, RA control unit 400, etc.) are connected to the components of the control and memory unit 3000 (e.g., embedded core 3200, external memory 3400, DMA 3600, etc.) through the system bus 2000. For example, the multimedia platform based on the present disclosure can be implemented to have a SoC structure with all of the system components connected through the single system bus 2000.

The control and memory unit 3000 includes an embedded core 3200 for processing and controlling data, an external memory 3400 for storing data, and a direct memory access (DMA) controller 3600 for transferring data. The embedded core 3200 can be a reduced instruction set computer (RISC) processor or a hybrid processor having both the characteristics of the RISC processor and a complex instruction set computer (CISC) processor.

The multimedia platform as referenced in FIG. 1 can perform various operations including floating-point operations using a PE array structure for integer arithmetic. An efficient processor can be implemented while maintaining the hardware size of the multimedia platform at a level similar to that of a conventional multimedia platform. Furthermore, the multimedia platform based on the techniques and systems of the present specification can be effectively used for current mobile multimedia devices requiring high performance yet low power consumption. Such power consumption reduction and high performance can be achieved by implementing the multimedia platform using the SoC structure where the components of the RA processor 1000 are connected to the components of the control and memory unit 3000 through the single system bus 2000. The ability of the RA processor 1000 to perform floating-point operations in addition to its PE/RA structure is further described with reference to FIG. 2 below.

Figure 2:
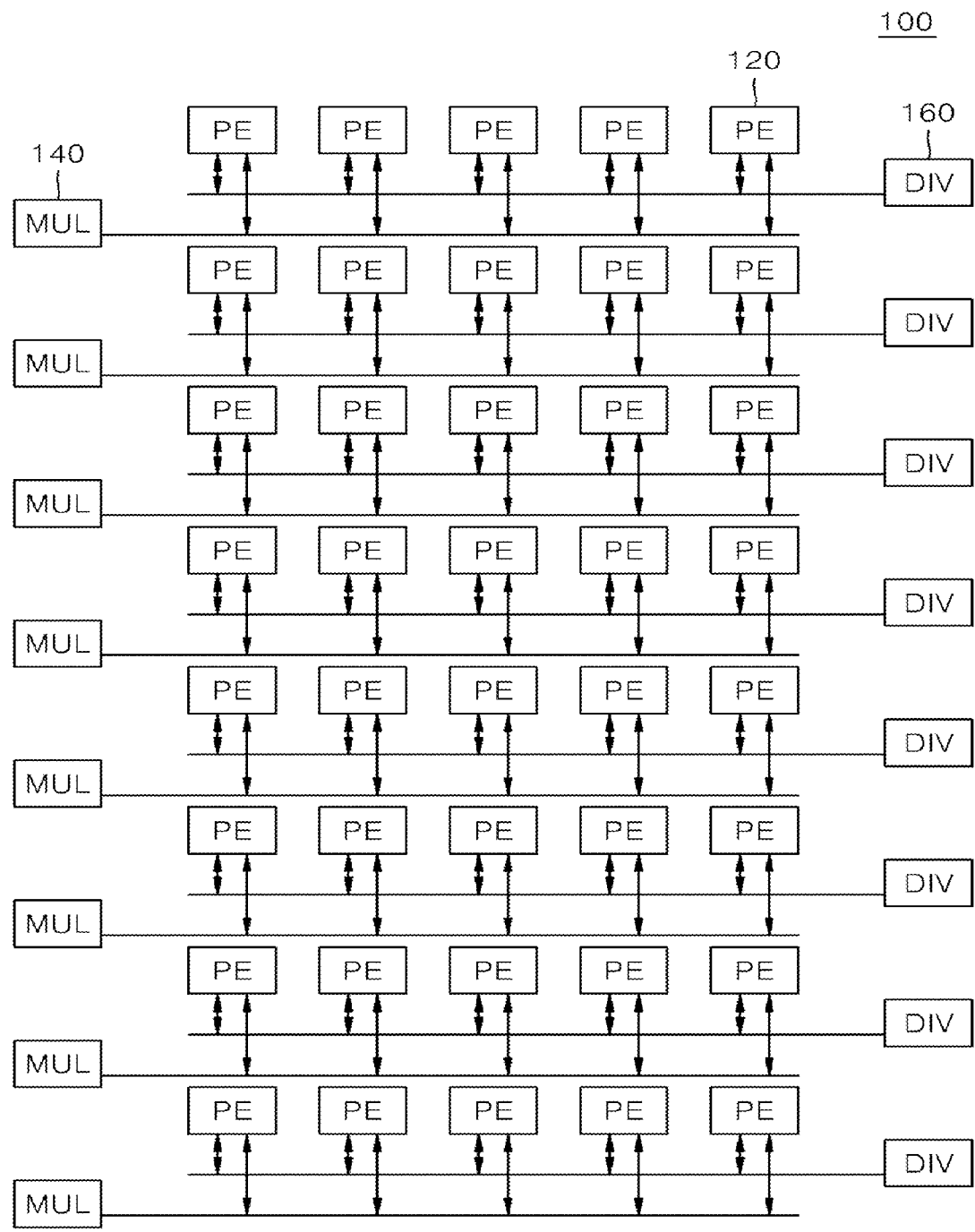
FIG. 2 is a block diagram of a processing element (PE) array structure.

FIG. 2 is an example block diagram of the PE array 100 (or RA) illustrated in FIG. 1. In the example shown in FIG. 2, the PE array 100 is shown to include various programmable PEs 120 arranged in an array of rows and columns (e.g., an 8×5 array). The PE array 100 is connected to one or more multipliers 140 and dividers 160 through various data buses to perform multiplications and divisions. For example, each row of PEs 120 is shown to be connected to a multiplier 140 and a divider 160. Because each PE 120 performs a multiplication and/or a division in the event of integer arithmetic, the example illustrated in FIG. 2 shows all of the PEs 120 connected to the multipliers 140 and/or the dividers 160. However, in the event of performing floating-point operations, only some of the PEs 120 may be connected to some of the multipliers 140 and/or dividers 160.

Each PE 120 in the array 100 includes an arithmetic logic unit, such as a 16-bit adder (not shown) that receives and processes two inputs and performs a 16-bit integer arithmetic operation. In the event of performing integer arithmetic operation, the context layer of the configuration cache 200 (illustrated in FIG. 1) stores an instruction for performing the integer arithmetic, and operations and data flows in the PEs 120 are controlled based on the context for the integer arithmetic operation.

The PE array 100 can be connected in a mesh structure to enable exchange of data among the PEs 120. The interconnection of PEs and/or data exchange among the PEs can be achieved based on the context of the configuration cache 200 (illustrated in FIG. 1). That is, the PEs 120 construct pipelines in rows (horizontally) or columns (vertically) based on the context received through the configuration cache 200 (illustrated in FIG. 1) and forward a result of a pipelined operation to a direction (horizontal or vertical) designated by the context.

FIG. 2 illustrates the PE array 100 arranged as an 8×5 array structure. The 8×5 arrangement structure is converted into a 4×5 arrangement structure when floating-point operations are performed, and thus the PE array 100 can easily support a 4×1 vector operation useful for 3D graphics, for example. To form the 4×5 arrangement structure, the PEs in the array 100 are arranged (by forming connections) to form various groups of two or more PEs. In some implementations, the PE array 100 is arranged in various array structures other than the illustrated 8×5 array. The detailed structure of the PEs 120 is further described with reference to FIG. 8 below.

Figure 3:
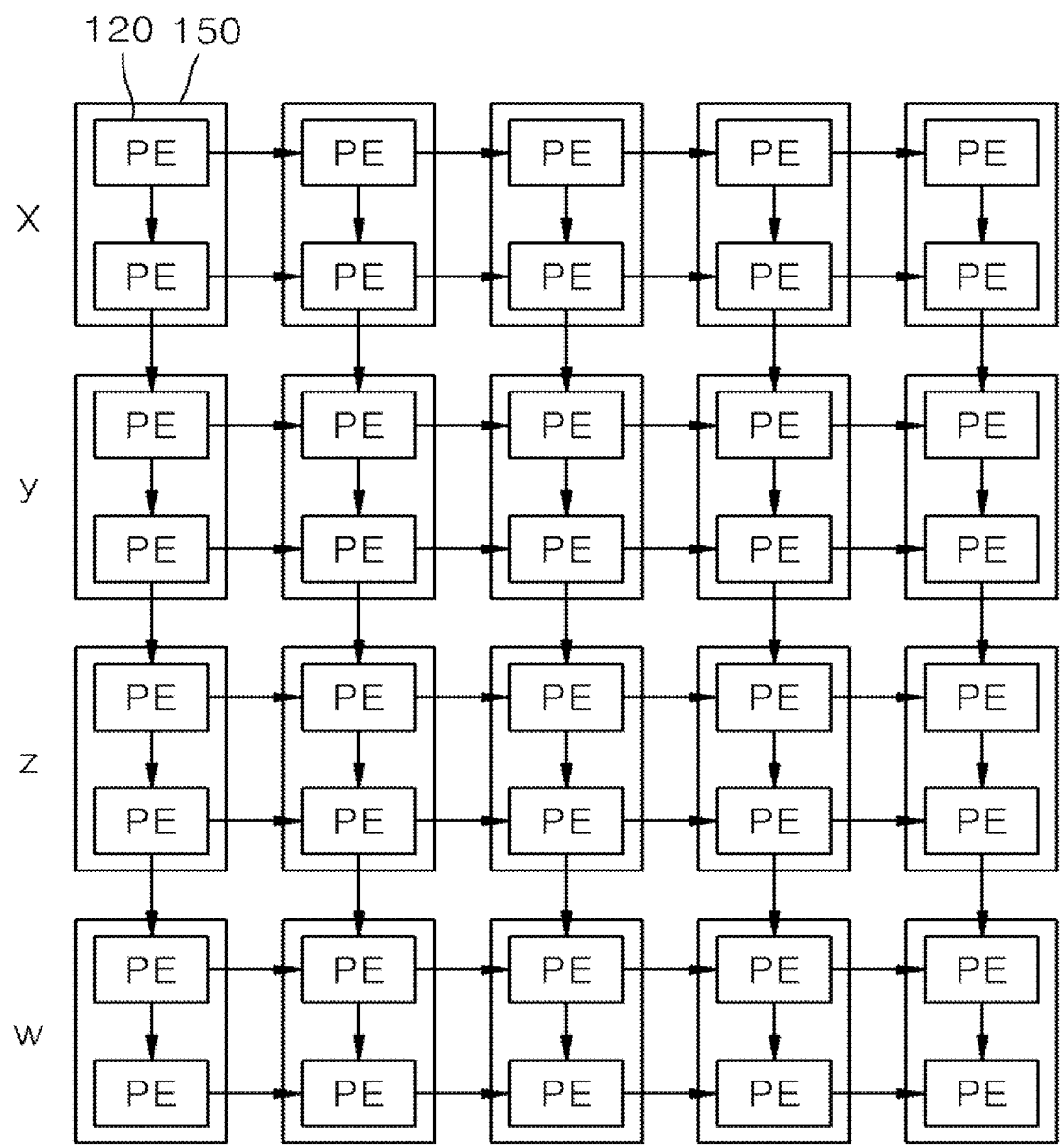
FIG. 3 is a block diagram of a PE array structure in which PEs are paired to form floating-point unit-processing elements (FPU-PEs) for performing floating-point operations.

FIG. 3 is an example block diagram of the PE array 100 when the PEs 120 constructing the PE array 100 are rearranged for floating-point operations. In the example illustrated in FIG. 3, the PEs 120 are connected together to form various groups of PEs or FPU-PEs 150 for performing floating-point operations. Each of the FPU-PEs 150 is formed by connecting two PEs 120 in a row or a column based on a context instruction. To form the FPU-PEs 150, the PEs 120 are arranged using a simple hardware operation. For example, the two PEs 120 in each pair of PEs 120 are physically connected to each other. Furthermore, a simple software control mechanism is implemented to enable the constructed FPU-PEs 150 to perform floating-point operations.

FIG. 3 illustrates a structural result of rearranging (or converting) the PEs 120 of the PE array 100 from the 8×5 arrangement structure (as illustrated in FIG. 2) into a 4×5 arrangement structure. The PEs 120 are paired to form the FPU-PEs 150 for performing floating-point operations. The resultant 4×5 array arrangement structure can support a 4×1 vector operation useful for 3D graphics, for example. In FIG. 3, X, Y, Z and W represent respective components (each row) of a 4×1 vector array. In some implementations, the FPU-PEs 150 can be formed in the PE array 100 using other arrangement methods. For example, three or more PEs 120 can be combined together to form each FPU-PE 150 in order to support complicated floating-point operations such as a transcendental function and a square root function.

The FPU-PEs 150 formed in the PE array 100 are arranged to perform operations through temporal mapping. In addition, the FPU-PEs 150 are not designed to receive a next context until final values are obtained. Operations through temporal mapping are described further with reference to FIG. 5 below.

Figure 4:
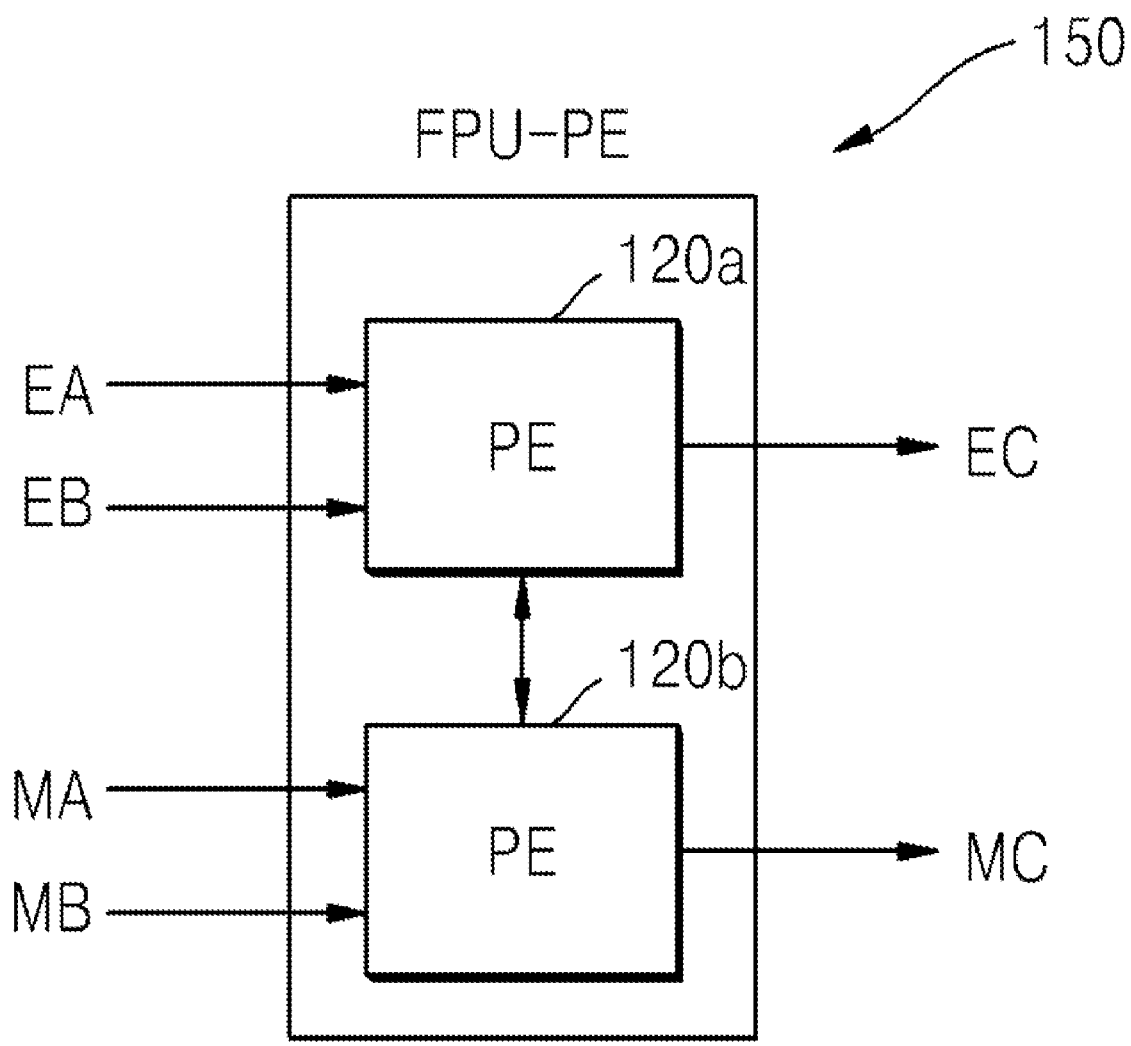
FIG. 4 is a block diagram illustrating an operand input structure for a floating-point operation.

FIG. 4 is an example block diagram illustrating an operand input structure for a floating-point operation in the FPU-PE 150 illustrated in FIG. 3. In the example illustrated in FIG. 4, the PEs 120a and 120b forming each of the FPU-PEs 150 are implemented using PEs that perform a 16-bit integer arithmetic operation. Each of the PEs 120a and 120b receives two input operands, performs a predetermined operation on the received two inputs and outputs a single output value.

An example structure of the FPU-PE 150 for performing floating-point operations includes a mantissa calculating component and an exponent calculating component. In particular, the FPU-PE 150 includes a mantissa PE 120a that receives the signs and mantissas of the received two operands. The FPU-PE 150 also includes an exponent PE 120b that receives the exponents of the two received operands. FIG. 4 shows two operands, "A" and "B" received by the FPU-PE 150. For example, assuming the received operands A and B are (11.111 and 222.222) respectively, the signs are "+" for both and the mantissas are (0.11111) and (2.22222) respectively. The signs (e.g., +) and mantissas (e.g., MA=0.11111 and MB=2.22222) of the received operands A and B are provided as inputs "MA" and "MB" to the mantissa PE 120a. Based on the received signs and mantissas, MA and MB, the mantissa PE 120a calculates an output mantissa "MC." The exponents of the received operands A and B are provided as inputs "EA" and "EB" to the exponent PE 120b. In the example above, the exponents EA and EB are (EA=2 and EB=2). Based on the received exponents EA and EB of the operands A and B, the exponent PE 120b calculates an output exponent "EC."

The mantissa PE 120a and the exponent PE 120b can include operation circuits (not shown) for processing floating-points and a data path through which data is exchanged between them. This additional hardware (e.g. circuitry) can be easily added to the existing PE array at a low cost.

The FPU-PE 150 can perform various operations such as transcendental function operations, logic operations and four fundamental rules of arithmetic operations that are based on floating-points. For a conventional floating-point based PE, the number of integer arithmetic operations that can be simultaneously performed (i.e., in parallel using pipeline processing) is equal to the number of floating-point operations that can be simultaneously performed. Based on the techniques and systems described in this specification, each FPU-PE 150 can be divided into two PEs for performing two integer arithmetic operations. Thus, the number of integer arithmetic operations that can be simultaneously performed by the FPU-PEs 150 is double the number of integer arithmetic operations that can be simultaneously performed by a floating-point based PE. Such doubling of the integer arithmetic operations is an example of efficient hardware usage.

Similar to the PE array 100 described with reference to FIG. 2 above, the mantissa PE 120a can be connected to a multiplier and/or a divider (not shown) to enable multiplication and division operations. In addition, the mantissa PE 120a and the exponent PE 120b in each FPU-PE 150 are connected to each other to enable exchange of a generated carry value. When a multiplication or division operation is performed in floating-point arithmetic using the FPU-PE 150, the exponent PE 120b calculates the output exponent EC through an addition or subtraction of the received exponents of the operands. In addition, the mantissa PE 120a calculates the output mantissa MC through a multiplication or a division of the received signs and mantissas of the two operands A and B.

When detected that the generated output values MC and EC are not final values (e.g., are interim values with more FPU-PEs are left to perform additional calculations), the output mantissa value MC of the mantissa PE 120a and the output exponent value EC of the exponent PE 120b are inputted to the next FPU-PE 150 in the array 100 (in the same row or column) to perform the next operation. When the calculated output values EC and MC are detected to be final values (e.g., are not interim values and no more FPU-PE 150s remain), the calculated output values EC and MC are stored in the frame buffer 300.

Figure 5:
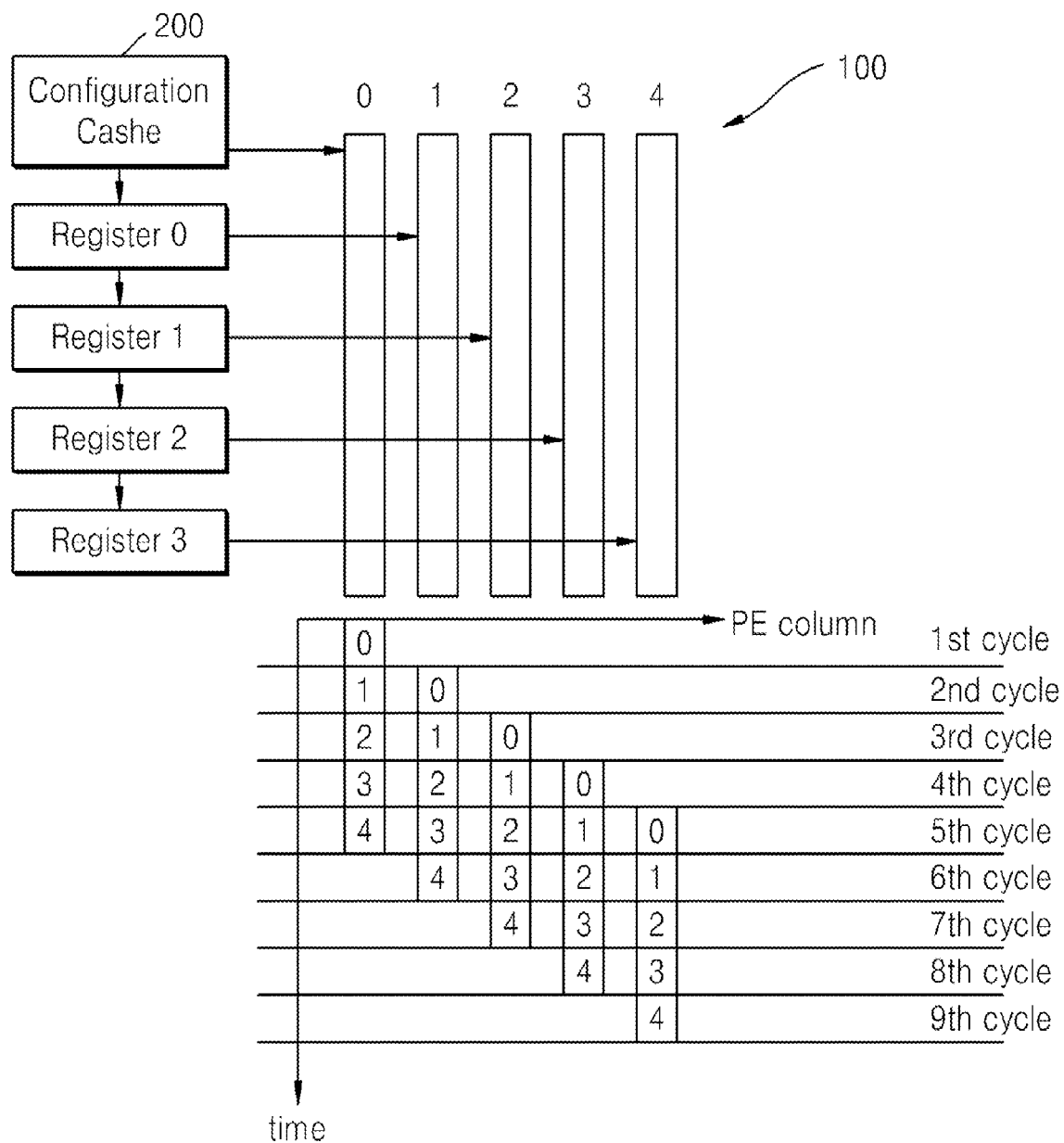
FIG. 5 illustrates a data operation process through temporal mapping in a FPU-PE structure.

FIG. 5 illustrates an example data operation process of using temporal mapping in the FPU-PE 150. The process of mapping in an RA processor can be implemented using spatial mapping and/or temporal mapping. The FPU-PE uses only the temporal mapping for floating-point operations.

In a conventional temporal mapping process, one of PE columns of a PE array is selected corresponding to one of context layers of a configuration cache and an operation context stored in the same context layer is provided to the selected PE column. Then, the selected PE column sequentially performs a single operation during multiple cycles. Even though the operation of the selected PE column is not completed, another PE column corresponding to the next context layer can be selected and an operation can be performed in that next selected PE column. In this manner, a pipelined operation can be performed column by column.

Referring to FIG. 5, the various contexts stored in the layers of the configuration cache 200 and registers are sequentially temporal-mapped to respective FPU-PE columns to perform a pipelined operation. The temporal-mapping through registers is delayed by one cycle for each register. Unlike the conventional temporal-mapping, each FPU-PE forming columns (e.g., columns 0, 1, 2, 3 and 4) of the PE array 100 receives the context, that is, control signal sequences generated from the context layers so as to perform a multi-cycle operation, and does not receive a next context before obtaining final result values through all cycle.

In the example of the multi-cycle operation shown in FIG. 5, the two PEs (an exponent PE and a mantissa PE) forming a single FPU-PE are used to transmit and receive interim result values as needed. For a multiplication or division operation in float-point arithmetic, for example, one of the two PEs (e.g., the exponent PE) forming the single FPU-PE calculates an exponent output through an addition or a subtraction operation and the other PE (e.g., the mantissa PE) calculates a mantissa output through a multiplication or a division operation. The carry value generated when the mantissa is calculated can be transmitted and used to calculate the final exponent output.

Figure 6:
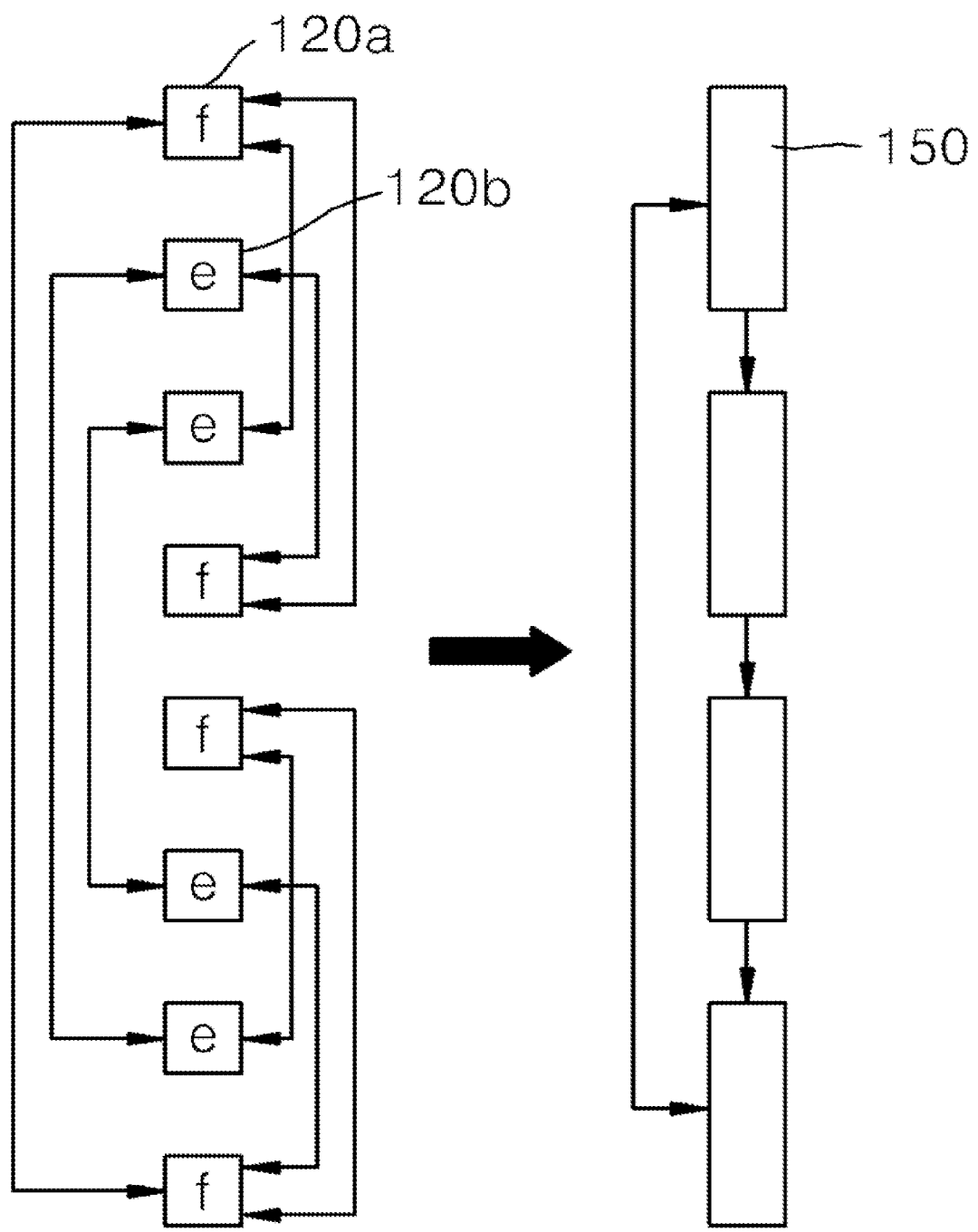
FIG. 6 illustrates data transfer using connection of PEs in a FPU-PE structure.

FIG. 6 illustrates an example data transfer using the connectivity of PEs 120 in the FPU-PEs 150. In the example shown in FIG. 6, the positions of mantissa PEs 120a are indicated using the letter "f" and the positions of the exponent PEs 120b are indicated using the letter "e". The positions, f and e, of the mantissa PEs 120a and the exponent PEs 120b can be adjusted to smoothly transfer the floating-point data among the PEs 120.

The PEs in the first, fourth, fifth and eighth positions are shown as mantissa PEs 120a that each calculates a mantissa output. The PEs in the second, third, sixth and seventh PEs are shown as exponent PEs 120b that each calculates an exponent output. These PEs can be connected and arranged using a mesh connection of four PE pairs in a single PE column. For example, bidirectional connections can be provided between (1) the first and fourth PEs (mantissa PEs 120a); (2) the fifth and eighth PEs (mantissa PEs 120a); (3) the second and seventh PEs (exponent PEs 120b); (4) the third and sixth PEs (exponent PEs 120b); (5) the first and eighth PEs (mantissa PEs 120a); (6) the first and third PEs (mantissa PE 120a and exponent PE 120b respectively); (7) the second and fourth PEs (exponent PE 120b and mantissa PE 120a respectively); (8) the fifth and the seventh PEs (mantissa PE 120a and exponent PE 120b respectively); and (9) the sixth and the eighth PEs (exponent PE 120b and mantissa PE 120a respectively).

Alternatively, when the first, third, fifth and seventh PEs are arranged to calculate a mantissa and the second, fourth, sixth and eighth PEs are arranged to calculate an exponent, eight connections can be formed (see FIG. 7C below). For example, bidirectional connections formed between the first and seventh PEs, between the second and eighth PEs, between the third and fifth PEs and between the fourth and sixth PEs are added to form the mesh connection of the four PE pairs.

As described above, the PE array 100 included in the RA processor can be implemented to smoothly perform floating-point calculation and data transfer without modifying the existing connectivity of PEs. Furthermore, when the PE array 100 is implemented as an 8×5 array arrangement structure, the 8×5 array arrangement structure can be retained to perform integer arithmetic operations. The same 8×5 arrangement array structure can be converted into a 4×5 array arrangement structure by pairing up the PEs to form various FPU-PEs to perform floating-point operations. Thus a 4×1 floating-point vector operation can be smoothly performed by converting the original 8×5 array structure.

Figure 7A:
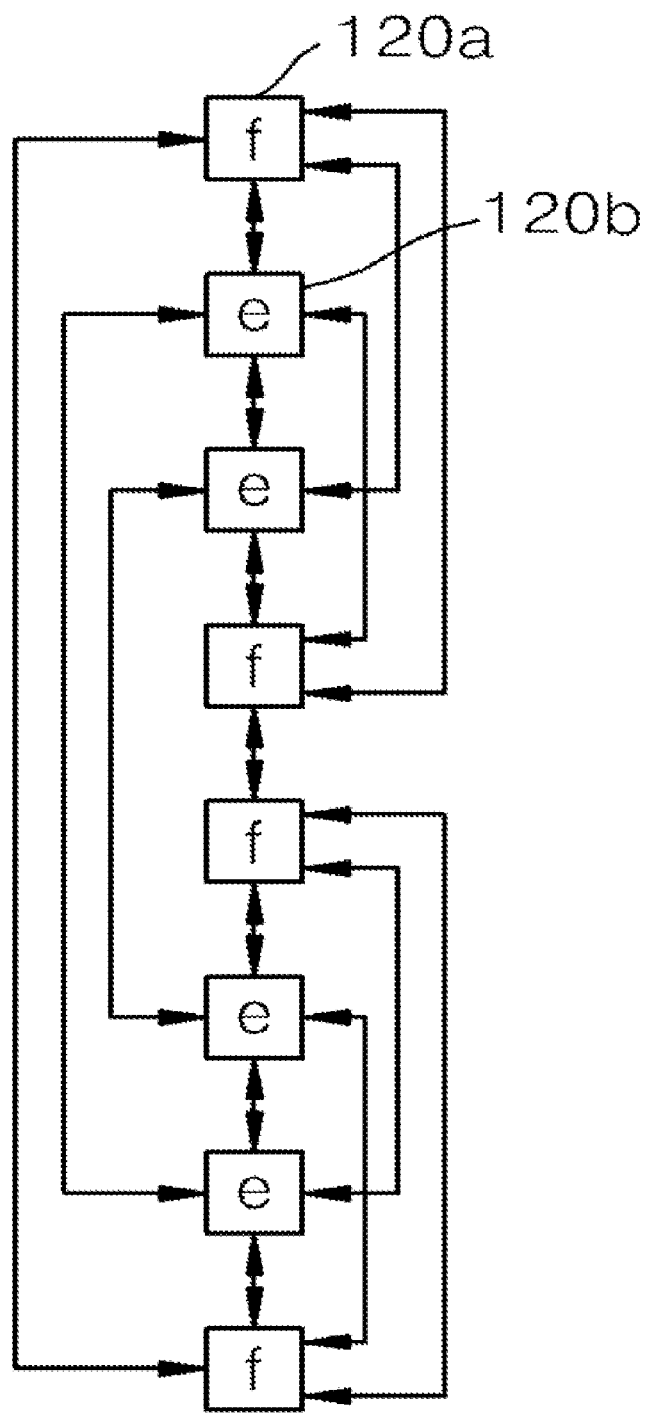
FIGS. 7A, 7B and 7C illustrate connection of PEs in the FPU-PE structure for explaining the advantage of adjustment of PE positions.
Figure 7B:
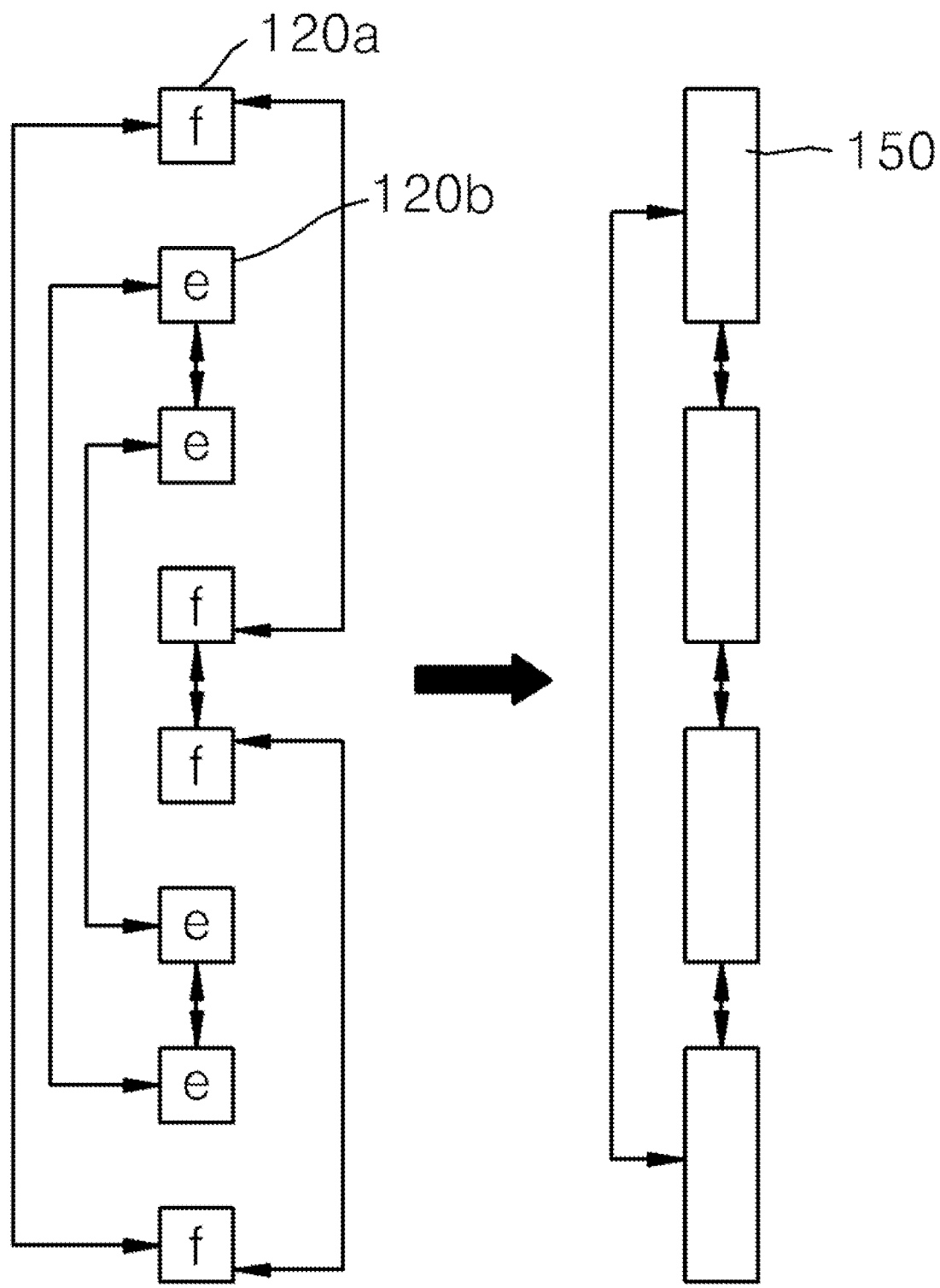
Figure 7C:
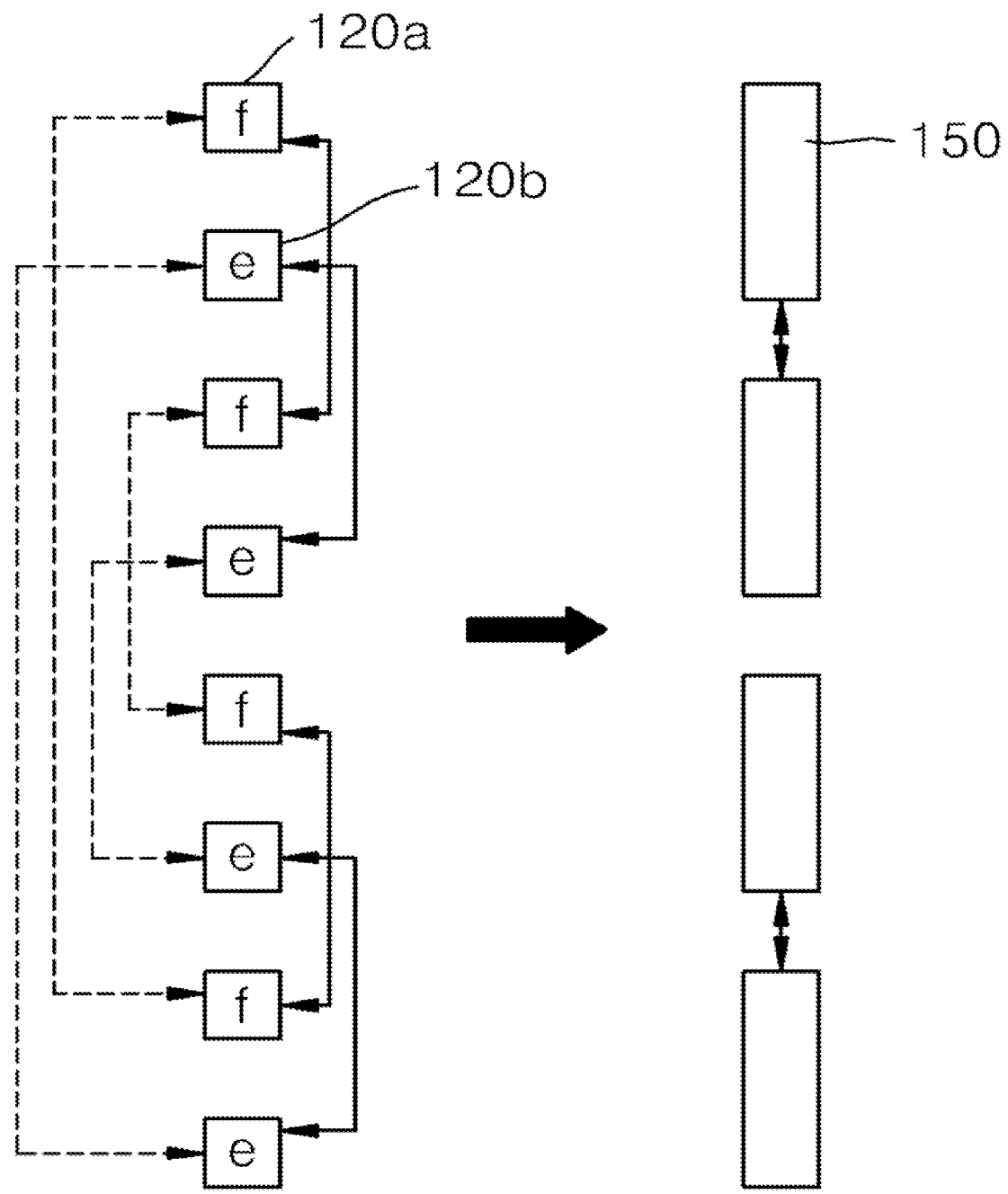

FIGS. 7A, 7B and 7C illustrate example PE connectivity in a FPU-PE structure to show the advantage of adjusting the various PE positions. FIG. 7A illustrates a connectivity of PEs in a PE column for integer arithmetic. FIG. 7B illustrates a connectivity of PEs in which functional positions of the PEs are adjusted for floating-point operations. FIG. 7C illustrates a connectivity of PEs in which the functional positions of the PEs are alternately arranged (e.g., a mantissa PE 120a followed by an exponent PE 120b, which is followed by another mantissa PE 120a, etc.)

The connectivity structure of FIG. 7A represents a typical PE connectivity structure for performing integer arithmetic operations. In the connectivity structure of FIG. 7A, it is not necessary to discriminate between the mantissa PE 120a and the exponent PE 120b because the PEs are connected for integer arithmetic. For example, any combination of exponent and/or mantissa PEs can be implemented.

When the functional positions of the PEs are arranged for floating-point operations as illustrated in FIG. 7B, a mesh structure can be obtained by selectively using the connection structure of FIG. 7A, as described above with reference to FIG. 6. The PEs are paired to form various FPU-PEs 150. However, when the functional positions of the mantissa and exponent PEs 120a. 120b are presented in different arrangements (other than the one illustrated in FIG. 6), different connection structures may be necessary to achieve a mesh structure. For example, the functional positions of the PEs may be alternately arranged (a mantissa PE 120a followed by an exponent PE 120b, which is followed by another mantissa PE, etc.) as illustrated in FIG. 7C. In such arrangements, the connections indicated by dotted lines (e.g., a bidirectional connection between the first and the seventh PE (mantissa PE 120a and) are newly formed as illustrated in FIG. 7C to achieve the mesh structure.

Figure 8:
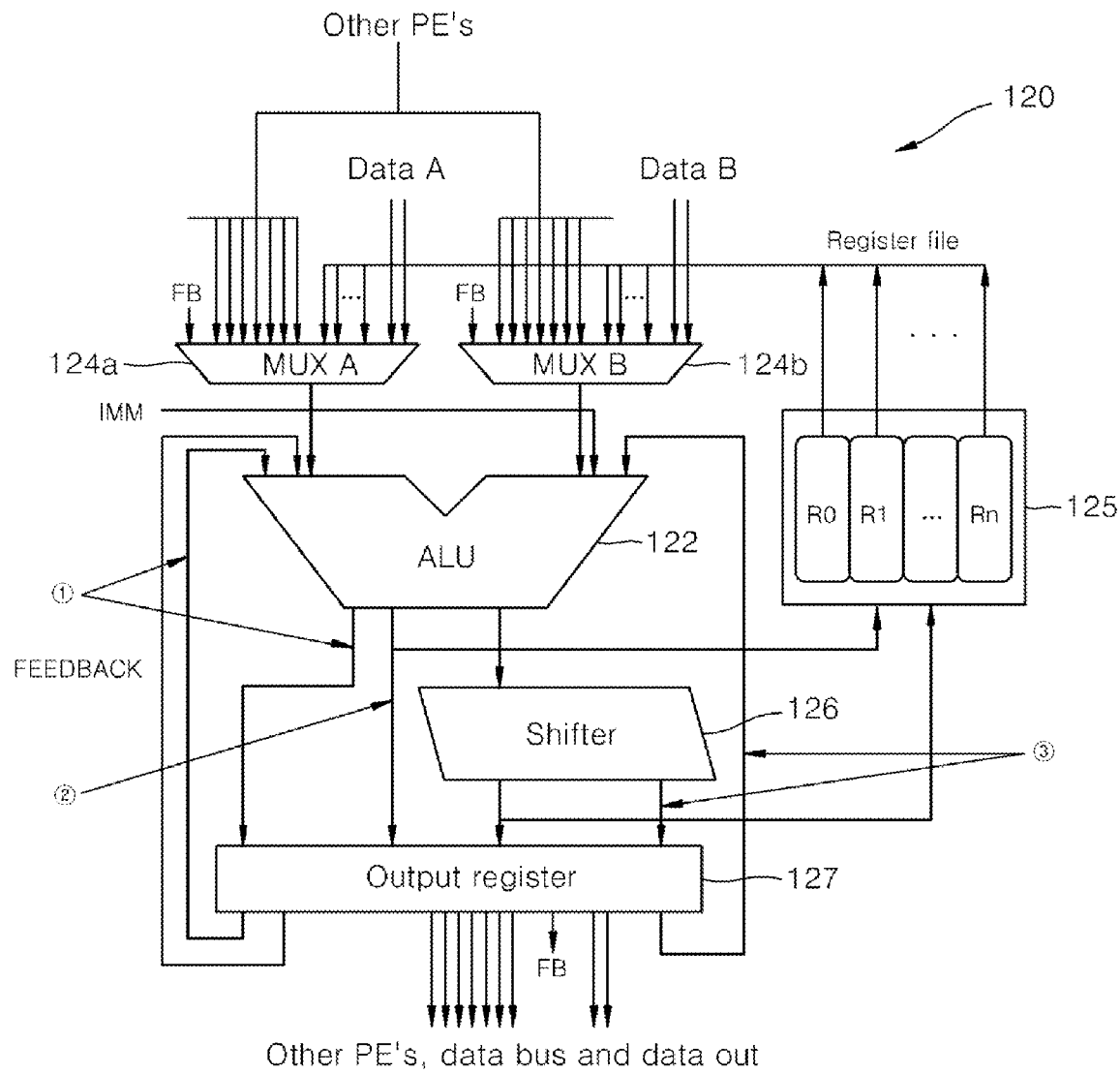
FIG. 8 is a block diagram of the PE structure.

FIG. 8 is a block diagram of an example PE (such as PE 120 illustrated in FIG. 2.) The PE structure 120 based on the techniques and systems of the present specification includes circuits for floating-point operations and paths for transmitting/receiving data in addition to the existing PE structure for integer arithmetic.

Referring to FIG. 8, the PE 120 includes a 16-bit adder 122, one or more multiplexers 124a and 124b designed to apply two data signals to an adder (ALU) 122, a temporary register 125 and an output register 127 for storing calculation results of the adder 122, and a shifter 126 for performing a shift operation.

The multiplexers 124a and 124b are designed to receive multiple signals from other PEs, data buses Data A and Data B, a frame buffer FB and the temporary register 125 to the adder 122. From the received signals, two signals are selected as input data signals. The adder 122 performs an operation on the two input data signals. Operation result values of the adder 122 are stored in the temporary register 125 or the output register 127. Values stored in the temporary register 125 are re-used for operations performed by the adder 122. The shifter 126 performs a shift operation for a multiplication or a division. A final result value stored in the output register 127 is input to other PEs through a data bus, stored in the frame buffer FB through a data bus, or output to an output device.

The circuits and data paths added for performing floating-point operations are indicated by reference numbers ①, ② and ③. The reference number ① represents a register and a data path for processing a sign signal in the floating-point operations. In particular, signs of the two received operands are received, stored, and then the result of an XOR operation performed on the signs is stored and/or transferred through the register and the data path. The register and the data path are effective only in a mantissa PE and determine the sign of a result value of a multiplication/subtraction operation.

The reference number ② represents a register and a data path for processing a non-shifted (i.e., not processed by the shifter 126) output signal. While an ALU of a conventional PE outputs only a single result value, the ALU 122 of the PE 120 based on the techniques and systems of the present specification is designed to output two output values for the floating-point operations. Thus, an extra data path is added in the ALU 122. The shifter 126 is connected to only one data path because the data paths are not simultaneously used for a shift operation. Accordingly, values such as flag vectors, which are not required to pass through the shifter 126, are output to the output register 127 through the newly added data path represented by reference number ②.

The reference number ③ represents a data path for processing a round signal. When a floating-point operation is performed, a round operation may be needed after an exponent is shifted. To achieve the round operation, two lower bits are added to the shifter 126, and the data path ③ for processing extended data is newly added.

Figure 9A:
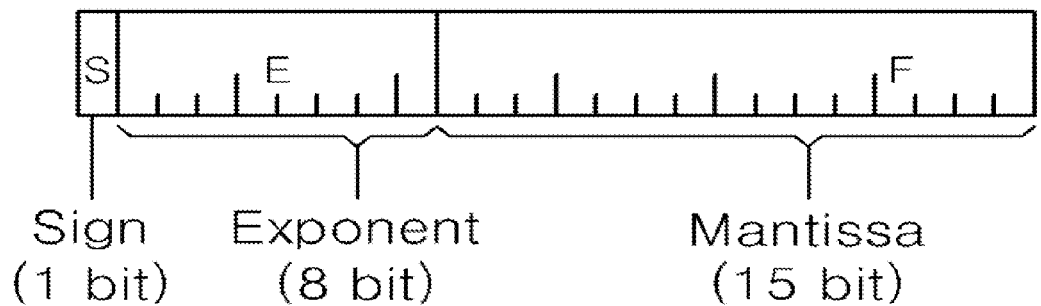
FIG. 9A illustrates a floating-point format of a frame buffer.

FIG. 9A illustrates an example floating-point format of a frame buffer used for performing floating-point operations. A floating-point determined based on the IEEE 754 standard has a 32-bit format including a 1-bit sign, an 8-bit exponent and a 23-bit mantissa. However, the IEEE 754 floating-point format has accuracy too high to be suitable for a 3D graphics application in mobile devices, and thus results in excessive memory waste. The frame buffer included in the RA processor based on the techniques and systems of the present application has a 24-bit floating-point format that includes a 1-bit sign, an 8-bit exponent and a 15-bit mantissa. In addition, the 24-bit floating-point of the present specification is designed to support floating-point operations and reduce or minimize excessive memory waste.

Figure 9B:
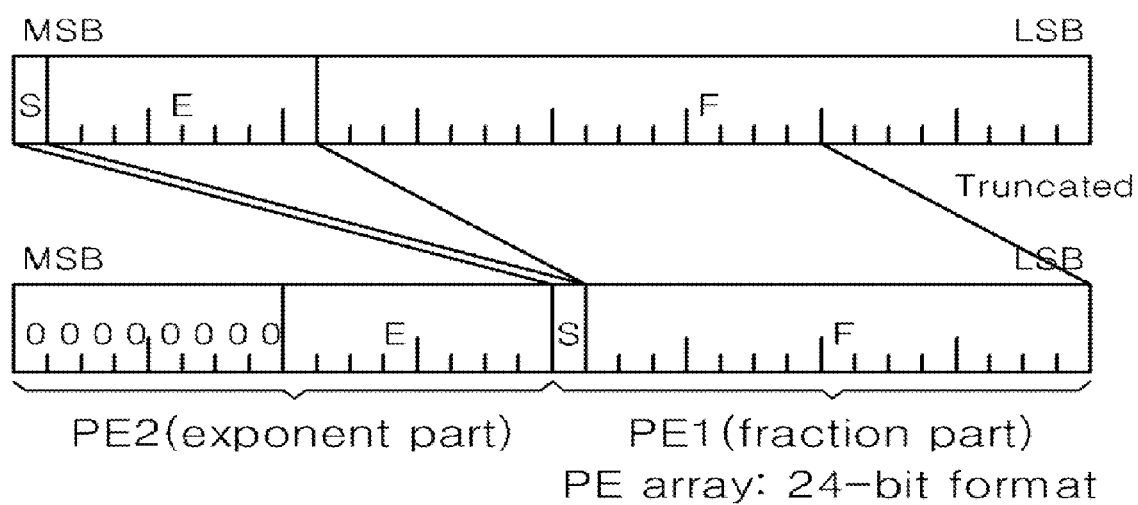
FIG. 9B illustrates conversion of data of a FPU-PE into data of a frame buffer.

FIG. 9B illustrates an example conversion of floating-point data of a FPU-PE into data of a frame buffer. A frame buffer is usually designed to receive only integer inputs in an integer arithmetic structure. However, in the RA processor 100 based on the present specification, a simple selection circuit is added to enable a multiplexer to select one of an integer data format and a floating-point data format. While the data stored in the frame buffer formally has a 32-bit floating-point format of IEEE-754, the data is used internally as the 24-bit floating-point format as illustrated in FIG. 9A. To use the 32-bit floating-point format as the 24-bit floating-point format, the frame buffer used in the RA processor based on the present specification selectively truncates the mantissa. In particular, the lower 8 bits of the mantissa of the 32-bit frame buffer is selectively not used.

Figure 10:
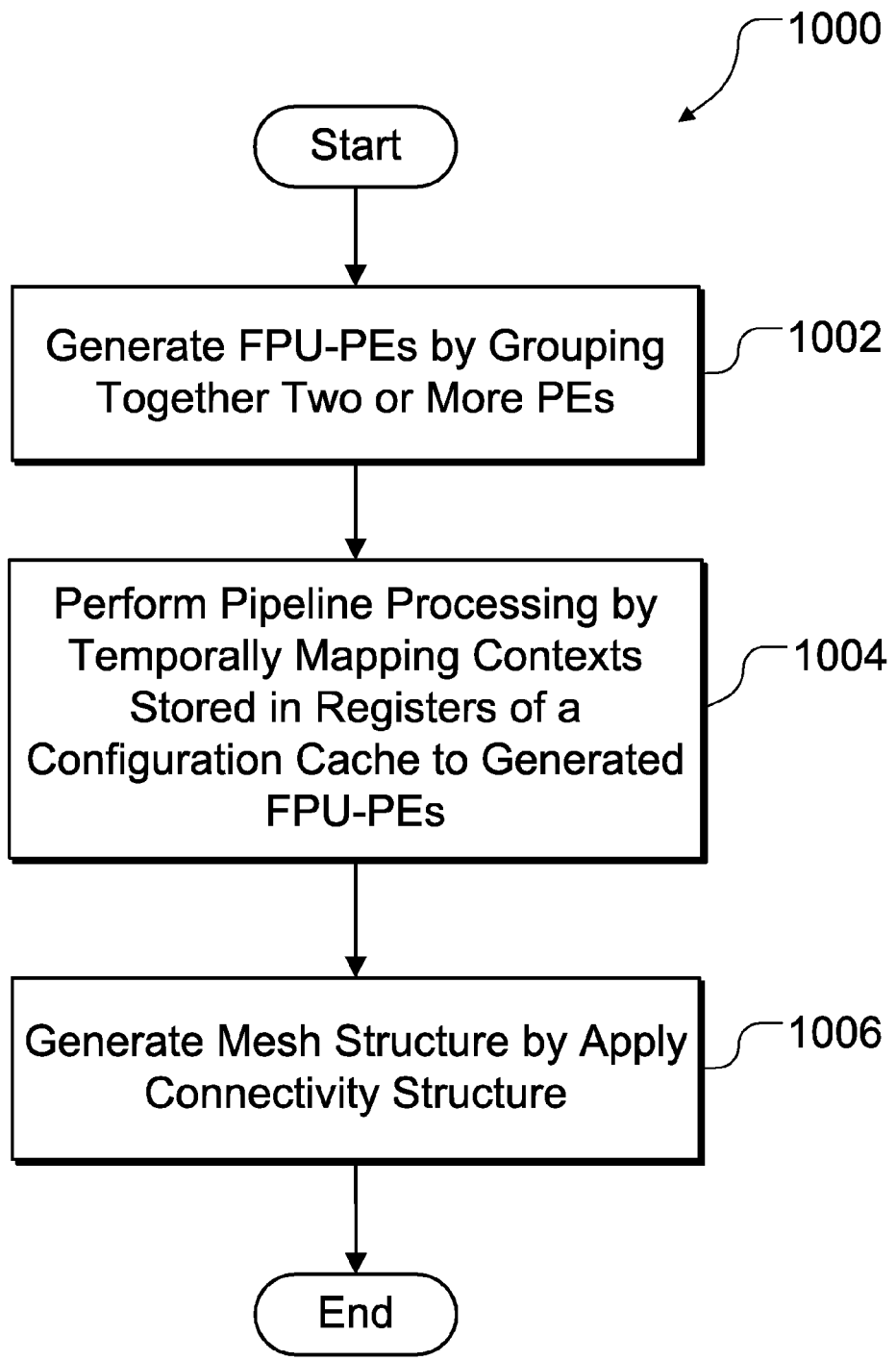
FIG. 10 is a process flow diagram of a process for generating an RA processor for performing floating-point arithmetic operations.

FIG. 10 is a process flow diagram of a process 1000 for generating an RA processor for performing floating-point arithmetic operations. The multiple PEs in the PE array are grouped together 1004 (e.g., groups of two or more PEs) to form various FPU-PEs 1002. For example, two PEs in a row can be paired to form a FPU-PE. Alternatively, two PEs in a column can be paired to form a FPU-PE. In some implementations, three or more PEs in a row or a column can be arranged together to form the FPU-PEs. The contexts stored in the registers of the configuration cache are sequentially temporal-mapped 1004 to respective FPU-PE columns to perform a pipelined operation. Further, a connectivity structure is applied to the array to connect 1006 the FPU-PEs in a row and/or column to achieve a mesh structure.

Figure 11:
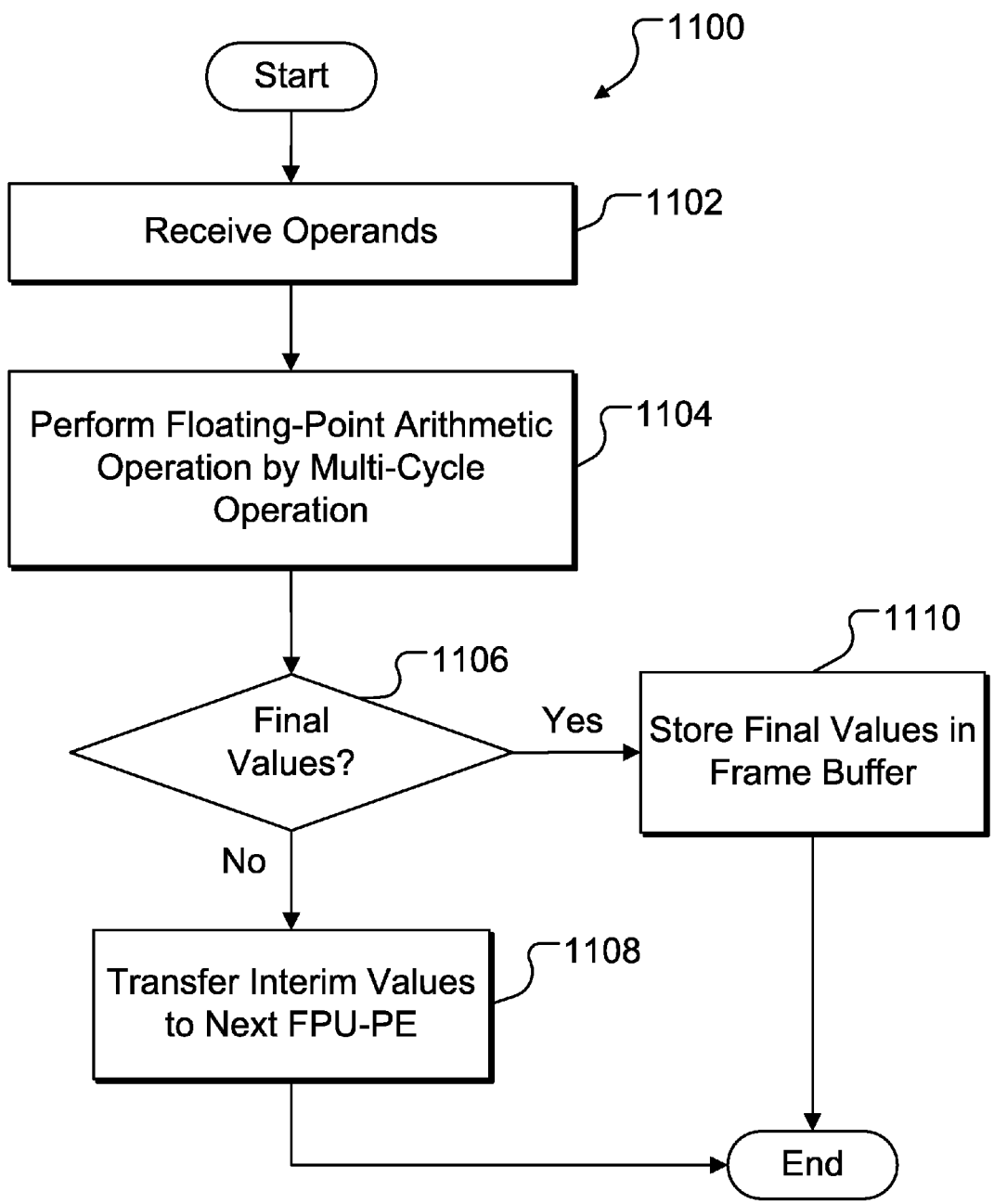
FIG. 11 is a process flow diagram of a process for performing floating-point arithmetic operations.

FIG. 11 is a process flow diagram of a process 1100 for performing floating-point arithmetic operations. Two operands are received 1102 for performing floating-point multiplication. Appropriate mathematical operations are performed 1104 through a multi-cycle operation using an exponent PE and a mantissa PE. For multiplication or division operations, exponents of the received operands are inputted into an exponent PE to generate an output exponent by adding or subtracting the exponents of the received operands. The signs and mantissas of the received operands are inputted into a mantissa PE to generate an output mantissa by multiplying or dividing the signs and mantissas of the received operands. For addition or subtraction operations, exponents of the received operands are inputted into an exponent PE to calculate a difference between two exponents of the received operands. Then, signs and mantissas of the received operands are inputted into a mantissa PE and one mantissa of two mantissas of the received operands is aligned by the difference between the two exponents. An output mantissa is calculated by adding or subtracting the received mantissas. The resultant exponent and mantissa are detected 1105 to be either final values or interim values for operation of a next FPU-PE. When detected that the resultant exponent and mantissa are interim values for operation of a next FPU-PE, the interim values are transferred 1108 to the next FPU-PE in a row and/or column to perform the next operation. When detected that the resultant exponent and mantissa are final values, the final values are stored 1110 in a frame buffer.

As described above, the RA processor 1000 based on the present specification can be implemented by adding simple hardware to the existing CGRA that includes the 16-bit PEs for performing integer arithmetic operations. The added hardware enables the formation of FPU-PEs each having a PE pair to perform floating-point operations. Accordingly, the RA processor 1000 of the present specification provides an efficient hardware structure by retaining a hardware size similar to that of the conventional RA processor. Furthermore, the RA processor based on the present specification enables high operating efficiency by taking advantage of the existing integer arithmetic logics to perform integer arithmetic operations.

In some implementations, a multimedia platform including the RA processor 1000 can be implemented in a SoC structure, and thus the multimedia platform can be effectively applied to a mobile multimedia processor that requires low power consumption and high performance-to-cost ratio.

Moreover, the techniques and systems based on the present specification can be applied to geometry operations in various graphic fields including physical game engine hardware acceleration, evaluators for processing a curved face/curve line such as Bezier curve, acceleration of hardware of graphic geometry pre-processors for tessellation and interpolation, geometric units (matrix transformation & lighting effects) in a 3D graphic pipeline, a 3D vertex shader, and etc.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A processor comprising:
an array of processing elements arranged to enable a floating-point operation,
each processing element including an arithmetic logic unit to receive two input values and perform integer arithmetic on the received input values, and
the processing elements in the array being connected together in groups of two or more processing elements to enable floating-point operation, and being connected in a mesh structure to enable data communications among the connected processing elements; and
a configuration cache connected to the array to store a context that controls at least one of the integer arithmetic and floating-point arithmetic operations performed by the processing elements in the columns or rows of the array, and the data communications among the processing elements,
the processing elements being configured in columns or rows based on the context to form a pipeline, and forwarding a result of a pipeline operation to a direction designated by the context,
wherein each of the groups of two or more processing units is configured to
perform the integer arithmetic operation or the floating-point arithmetic operation through temporal mapping,
receive the context of a control signal so as to perform a multi-cycle operation, and
receive a next context after final values are through all cycles obtained.

2. The processor of claim 1, wherein the arithmetic logic unit comprises a 16-bit arithmetic logic unit.

3. The processor of claim 1, wherein at least two processing elements in a row or a column of the array are connected together to form the two or more groups to perform floating-point operations.

4. The processor of claim 1, wherein the array is selectively configured to operate in an 8×5 arrangement structure when performing the integer arithmetic operation, and operate in a 4×5 arrangement structure in which the processing elements are connected in pairs in each column of the array when performing the floating-point operation.

5. The processor of claim 1, wherein the two or more groups of two or more processing elements are configured to perform four fundamental rules of arithmetic and transcendental function arithmetic for floating-point operations.

6. The processor of claim 5, wherein each of the two or more groups of two or more processing elements comprises two of the processing elements connected to perform the four fundamental rules of arithmetic, wherein the two connected processing elements in each group includes:
a mantissa processing element to receive signs and mantissas of two operands; and
an exponent processing element to receive exponents from the two operands.

7. The processor of claim 6, wherein
the mantissa processing element is connected to at least one of a multiplier and a divider to multiply or divide the mantissa of the two operands; and
the exponent processing element is configured to add or subtract the exponents of the two operands.

8. The processor of claim 1, wherein each processing element comprises:
two multiplexers connected to the arithmetic logic unit to provide at least the two input values to the arithmetic logic unit;
a shifter connected to the arithmetic logic unit to perform a shift operation on a result received from the arithmetic logic unit;
a temporary register connected to the arithmetic logic unit and the shifter to store an interim result of the arithmetic logic unit and an interim result of the shifter; and
an output register connected to the arithmetic logic unit and the shifter to store a final result of the arithmetic logic unit and a final result of the shifter;
wherein each of the multiplexers is configured to select data from data received from a data bus, other processing elements and own register file, and input the selected data into the arithmetic logic unit, and
the final results stored in the output register are input into other processing elements or output through a data bus.

9. A reconfigurable array processor comprising:
an array of processing elements configured to perform one or more floating-point operations,
each of the processing elements comprising an arithmetic logic unit to receive and process two input values, and
the processing elements in the array being connected together in groups of two or more processing elements, and being connected in a mesh structure to enable data communications among the processing elements,
wherein the array is selectively configured to:
perform an integer arithmetic operation using each of the processing elements; or perform the one or more floating-point operations using each of the groups of two or more processing elements;

a configuration cache connected to the array to store a context configured to control one or more arithmetic operations performed by the processing elements in each column or row of the PE array, and enable data communications among the processing element, the processing elements being configured in columns or rows based on the context to form a pipeline, and a result of a pipeline operation being forwarded to a direction designated by the context; and a frame buffer connected to the array that operates as a cache memory to store an interim result of the one or more arithmetic operations performed by the array, wherein each of the groups of two or more processing units is configured to perform the integer arithmetic operation or the one or more floating-point arithmetic operations through temporal mapping;

receive the context of a control signal so as to perform a multi-cycle operation; and receive a next context after final values through all cycles are obtained.

10. The reconfigurable array processor of claim 9, wherein each of the two or more groups of two or more processing elements includes at least two processing elements in a row or a column of the array connected to perform the one or more floating-point operations.

11. The reconfigurable array processor of claim 10, wherein the array is selectively configured to operate in an 8×5 arrangement structure when performing the integer arithmetic operation, and operate in a 4×5 arrangement structure in which the processing elements are connected in pairs in each column of the array when performing the floating-point operation.

12. The reconfigurable array processor of claim 9, wherein the two or more groups of two or more processing elements are configured to perform four fundamental rules of arithmetic and transcendental function arithmetic for floating-point operations.

13. The reconfigurable array processor of claim 12, wherein each of the two or more groups of two or more processing elements comprises two of the processing elements connected to perform the four fundamental rules of arithmetic, wherein the two connected processing elements in each group includes:

a mantissa processing element to receive signs and mantissas of two operands; and an exponent processing element to receive exponents from the two operands.

14. The reconfigurable processor of claim 13, wherein the mantissa processing element is connected to at least one of a multiplier and a divider to multiply or divide the mantissa of the two operands; and the exponent processing element is configured to add or subtract the exponents of the two operands.

15. The reconfigurable array processor of claim 14, wherein the frame buffer has a 24-bit floating-point format.

16. The reconfigurable array processor of claim 15, wherein the 24-bit floating-point format includes one sign bit, eight exponent bits, and fifteen mantissa bits.

17. The reconfigurable array processor of claim 16, wherein the mantissa processing element is configured to convert the received signs and mantissas of the two operands into the one sign bit and the fifteen mantissa bits of the frame buffer, and store the converted one sign bit and the fifteen mantissa bits in the frame buffer: and the exponent processing element is configured to convert the received exponents of the two operands into the eight exponent bits of the frame buffer, and store the converted eight exponent bits in the frame buffer.

18. The reconfigurable array processor of claim 9, wherein each processing element comprises:

two multiplexers connected to the arithmetic logic unit to provide at least the two input values to the arithmetic logic unit;

a shifter connected to the arithmetic logic unit to perform a shift operation on a result received from the arithmetic logic unit;

a temporary register connected to the arithmetic logic unit and the shifter to store an interim result of the arithmetic logic unit and an interim result of the shifter; and an output register connected to the arithmetic logic unit and the shifter to store a final result of the arithmetic logic unit and a final result of the shifter;

wherein each of the multiplexers is configured to select data from data received from a data bus, other processing elements and own register file, and input the selected data into the arithmetic logic unit, and the final results stored in the output register are input into other processing elements or output through a data bus.

19. The reconfigurable array processor of claim 9, wherein the array comprises a coarse-grained reconfigurable array.

20. The reconfigurable processor of claim 19, further comprising a reconfigurable array control unit connected to the array to control operations of the array, the configuration cache and the frame buffer.

21. A computing platform comprising:

a reconfigurable array processor comprising a plurality of components including:

an array of processing elements configured to perform an integer arithmetic operation using each of the processing elements, or perform one or more floating-point operations using each of the two or more groups of two or more processing elements connected together;

wherein each of the processing elements comprises an arithmetic logic unit to receive and process two input values; and the processing elements of the array are connected in a mesh structure to enable data communications among the processing elements;

a configuration cache connected to the array to store a context configured to control one or more arithmetic operations performed by the processing elements in each column or row of the PE array, and enable data communications among the processing element, wherein the processing elements are configured in columns or rows based on the context to form a pipeline, and a result of a pipeline operation is forwarded to a direction designated by the context; and a frame buffer connected to the array that operates as a cache memory to store an interim result of the one or more arithmetic operations performed by the array;

a system bus connected to the reconfigurable array processor; and a control and memory unit connected to the reconfigurable array processor through the system bus to control the reconfigurable array processor and store data, wherein each of the groups of two or more processing units is configured to perform the integer arithmetic operation or the one or more floating-point arithmetic operations through temporal mapping;

receive the context of a control signal so as to perform a multi-cycle operation; and receive a next context after final values through all cycles are obtained.

22. The computing platform of claim 21, wherein the control and memory unit comprises:

an embedded core processing and controlling data;

an external memory storing data; and a direct memory access controller transferring data.

23. The computing platform of claim 22, wherein the embedded core comprises a reduced instruction set computer processor or a hybrid processor having both the characteristics of the reduced instruction set computer processor and a complex instruction set computer processor.

24. The computing platform of claim 23, wherein the computing platform is implemented in a system on chip structure to connect the components of the reconfigurable array processor to components of the control and memory unit through the system bus.

25. The computing platform of claim 23, wherein the two or more groups of two or more processing elements are configured to perform four fundamental rules of arithmetic and transcendental function arithmetic for floating-point operations.

26. The computing platform of claim 25, wherein each of the two or more groups of two or more processing elements comprises two of the processing elements connected to perform the four fundamental rules of arithmetic, wherein the two connected processing elements in each group includes:

a mantissa processing element to receive signs and mantissas of two operands; and an exponent processing element to receive exponents from the two operands.

27. The computing platform of claim 26, wherein the mantissa processing element is connected to at least one of a multiplier and a divider to multiply or divide the mantissa of the two operands; and the exponent processing element is configured to add or subtract the exponents of the two operands.

28. The computing platform of claim 25, wherein the frame buffer has a 24-bit floating-point format including one sign bit, eight exponent bits, and fifteen mantissa bits.

29. The computing platform of claim 21, wherein each processing element comprises:

two multiplexers connected to the arithmetic logic unit to provide at least the two input values to the arithmetic logic unit;

a shifter connected to the arithmetic logic unit to perform a shift operation on a result received from the arithmetic logic unit;

a temporary register connected to the arithmetic logic unit and the shifter to store an interim result of the arithmetic logic unit and an interim result of the shifter; and an output register connected to the arithmetic logic unit and the shifter to store a final result of the arithmetic logic unit and a final result of the shifter;

wherein each of the multiplexers is configured to select data from data received from a data bus, other processing elements and own register file, and input the selected data into the arithmetic logic unit, and the final results stored in the output register are input into other processing elements or output through a data bus.

30. The computing platform of claim 21, wherein the reconfigurable array processor comprises a coarse-grained reconfigurable array, and the reconfigurable array processor comprises a reconfigurable array control unit connected to the array to control the components of the reconfigurable array processor.

31. A method of performing at least one of an integer arithmetic operation and a floating-point operation by temporal mapping with an array of processing elements comprising:

receive a context stored in a configuration cache so as to perform a multi-cycle operation; and receive a next context after final values through all cycles are obtained, wherein the processing elements in the array are connected together in groups of two or more processing elements to enable floating-point operation, and are connected in a mesh structure to enable data communications among the connected processing elements, wherein the processing elements are configured in columns or rows based on the context to form a pipeline, and a result of a pipeline operation being forwarded to a direction designated by the context.

* * * * *